Patented Nov. 27, 1945

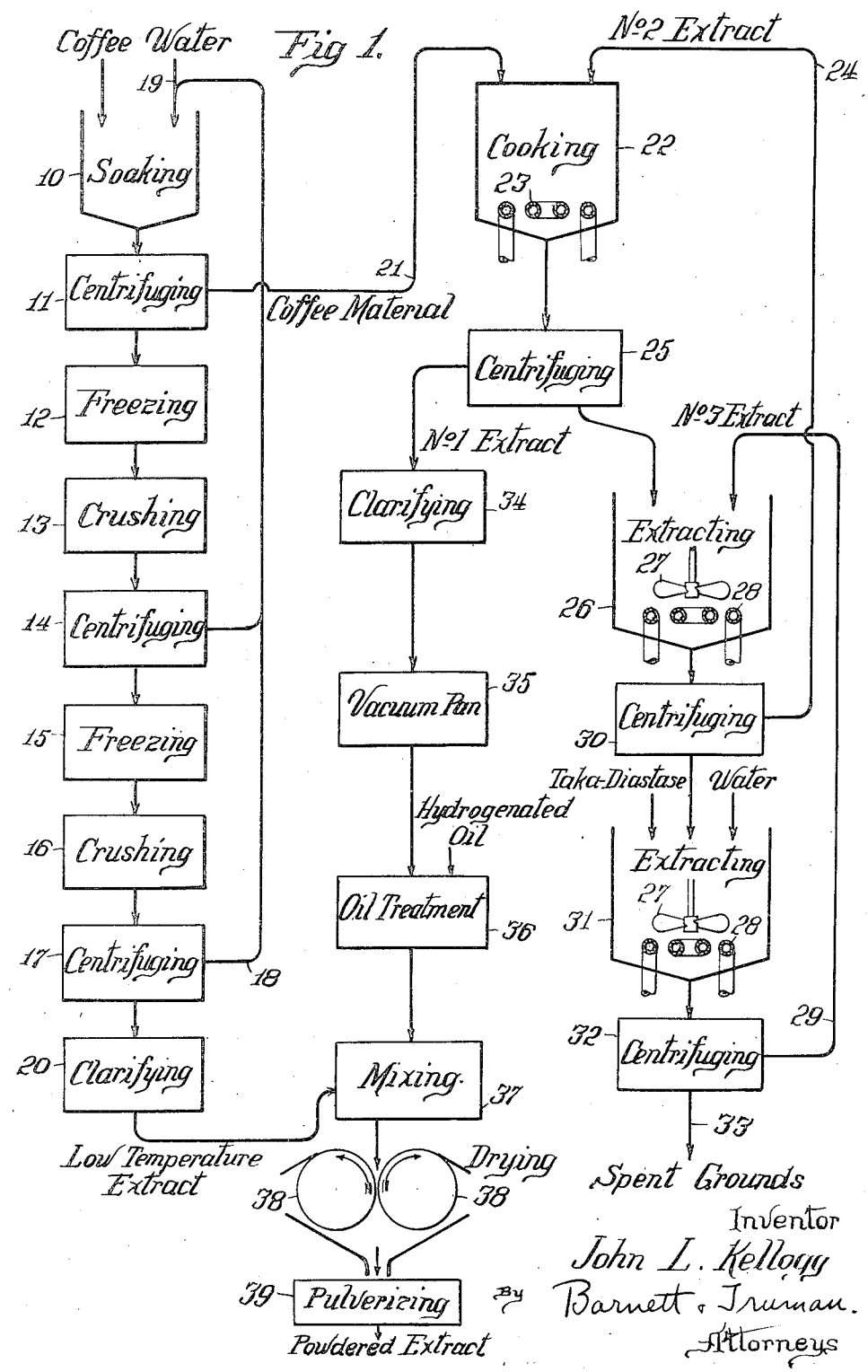

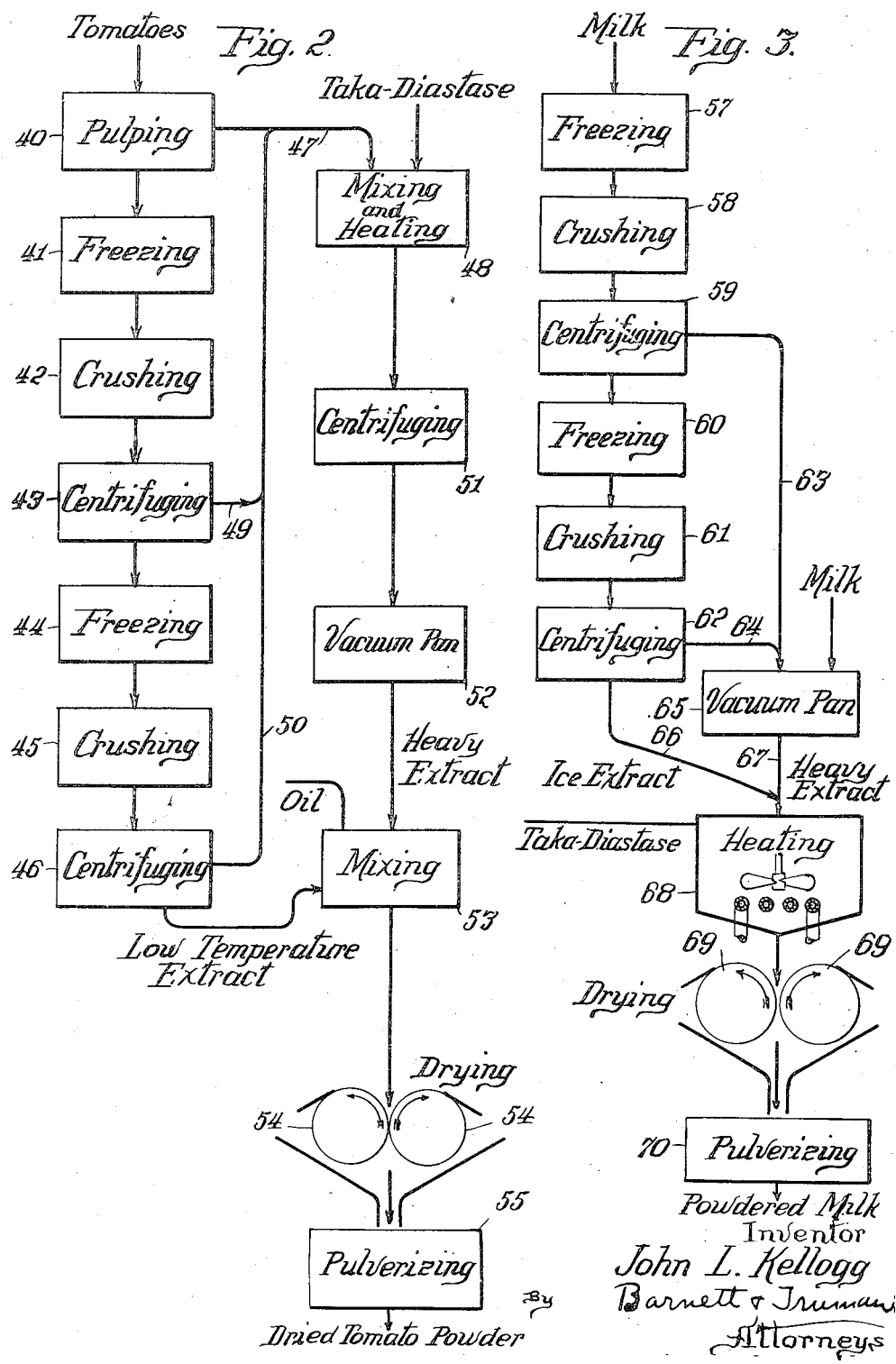

2,389,732

UNITED STATES PATENT OFFICE 2,389,732

TREATMENT OF ORGANIC LIQUIDS

John L. Kellogg, Chicago, Ill., assignor, by mesne assignments, to John L. Kellogg & Co., Chicago, Ill., a corporation of Illinois Application August 23, 1941, Serial No. 408,052

7 Claims. (Cl. 99—71)

This invention relates to the treatment of organic liquids such as extracts of coffee and decaffeinized coffee, vegetable extracts used as coffee substitutes, tea extracts, fruit and vegetable juices, soups and milk; and more particularly to the treatment of such liquids in connection with the condensing or evaporation of the same for the production of evaporated, condensed or powdered products; and the primary objects of the invention are to improve the keeping quality of such products, and, particularly in the case of condensed or evaporated liquids, to effect the retention and preservation of the original flavors and aromas of the organic material, solid or liquid, from which the extract or evaporated or condensed product is made, which flavors and aromas are likely to be lost or destroyed in part during the condensing, evaporating or drying operations.

To these ends the invention contemplates certain procedures which are capable of being used separately but are preferably used in conjunction one with the other as follows:

(1) The liquids, particularly, fruit and vegetable juices and milk, are preferably treated with a small quantity of taka-diastase, an enzyme derived from the fungus species *Eurotium oryzae* (United States patent to Takamine et al., No. 1,391,219, September 2, 1921) for the purpose of inhibiting or arresting bacterial action tending to bring about deterioration or spoiling of the organic liquids. The use of taka-diastase in the production of coffee extracts, for the solubilizing effect on the carbohydrate or related constituents of the coffee, is disclosed in applicant's co-pending application Serial No. 362,819, filed October 25, 1940, now Patent No. 2,281,138, and application Serial No. 412,898, filed September 29, 1941, now Patent No. 2,282,139, and these particular treatments are not specifically claimed herein.

In place of using taka-diastase other diastatic enzymes or substances containing diastatic enzymes might be used provided the use of such material does not detrimentally affect the taste of the product. Malt extract in most cases is not desirable because of the characteristic taste which it produces.

(2) If the organic liquid is to be condensed or evaporated at relatively high temperature, for example, in a vacuum pan, there is added to the heavy extract from the vacuum pan, a light extract or juice, for example, an extract made by freezing fresh material or making an extract therefrom with or without concentration at low temperature but above the freezing point; and if further evaporation is contemplated, for example, if the material is to be evaporated to dryness, the density of the mixture is calculated so as to be suitable for instantaneous drum or spray drying, whereby the volatilization of the taste and aroma giving constituents of the material during the final evaporation stage is minimized. By adding to the heavy extract from the vacuum pan, which because of the protracted evaporating operation may have lost some of its taste and aroma, an extract or juice which has not been subjected to evaporation or which has been extracted at relatively low temperatures, the mixture has restored to it the qualities removed or destroyed, or partially removed or destroyed, by the treatment in the vacuum pan.

(3) To further preserve and effect the retention of these taste and aroma giving substances, there is preferably mixed with the liquid, when this liquid is to be evaporated to dryness, a small quantity of a vegetable oil, preferably hydrogenated in part or wholly, and preferably, though not necessarily consisting, in part or wholly, of oil derived from the material treated, e. g., coffee oil in case of coffee extracts, orange oil in case of orange juice, et cetera. The oil is added to the mixture of light and heavy extracts, or to one or other of the constituent extracts before the extracts are subjected to the final drying operation. The functions of the oil, which is used in relatively small quantities, are first to retain flavor and aroma; and second to stop dust formation in the drying and subsequent treatment, grinding, for example, of the product.

(4) In the co-pending application of applicant, Serial No. 362,819, filed October 25, 1940, is disclosed an extracting process, intended particularly for the production of soluble coffee extracts in which the coffee material is given successive extracting operations, with heat and agitation, in which process the extracts move in counter-current to the coffee material. In this application there is also disclosed a cooking step in which the material, before it enters the last extracting operation, is cooked under steam pressure so as to make possible the removal of additional extractives in the extracting operation which follows—extractives which would not be removable by the usual extraction operation except for the cooking step—and thereby increase yields. The applicant has since discovered that the cooking step which does not involve agitation, or but little agitation, is more advantageously used at the stage of the process which gives the final extract going to the vacuum pan, which will be referred to, rather arbitrarily, as the No. 1 extract, meaning the extract from the first treatment of the material in the counter-current extracting system. By cooking the coffee material (which will preferably, as a matter of economy, be the material from which the preliminary or low temperature extract has been made) without this cooking step being followed by an extracting operation with agitation, a clearer extract is obtained than with the process of application Serial No. 362,819, where three extractions, with agitation, are made after the material has been cooked. The cooking coagulates colloids which may then be removed by filtration or centrifuging.

The invention is exemplified in the following specific examples which, however, should be regarded as typical and informative only and not as limiting the invention to the particulars given therein; the intention being to cover all equivalents of the process steps described and also all modifications of such processes within the scope of the hereto appended claims.

In the drawings are illustrated certain of the specific examples.

Figure 1 is a flow sheet illustrating the process of the present invention as applied to the production of coffee extracts.

Figure 2 is a flow sheet illustrating the process as applied to the production of extracts from fruits or vegetables, specifically to the production of concentrated tomato juice; and Figure 3 is a flow sheet illustrating the process as applied to the production of condensed, evaporated or powdered milk.

*Example 1—Process as applied to the production of coffee extracts. Flow sheet, Figure 1.*—35 pounds of roasted and ground coffee is introduced into a vessel 10 with 10 gallons of fresh, cold water. The material is allowed to soak in vessel 10 for about one hour. The material is then subjected to a separating operation, preferably by means of a centrifuge 11. The extract from centrifuge 11 is then frozen at 12, the ice crushed at 13, the crushed ice centrifuged at 14, the liquid frozen again at 15, the ice crushed at 16 and the crushed ice centrifuged at 17. The freezing, crushing and centrifuging operations may be repeated as often as desired in order to obtain as concentrated an extract as may be found necessary. The operations described will give an extract having a density of about 15° to 20° Baumé; although to obtain this density a third freezing operation may be required. The ice from centrifuges 14 and 17 is returned by line 18 to the fresh water supply 19 for the soaking vessel 10—the specified 10 gallons of fresh water including the water from the returned ice. The low temperature extract from the centrifuge 17 is preferably clarified in a clarifying centrifuge 20, or otherwise by filtration, and is mixed with the No. 1 extract produced by the counter-current extraction apparatus illustrated at the right-hand side of the flow sheet. The coffee material from centrifuge 11 goes through line 21 (fresh coffee may be added if desired) to the steam cooker 22 which is provided with a steam coil 23 or other suitable heating means. The coffee material mixed with No. 2 extract through line 24 is brought to a boil and boiled for about 5 minutes. The material is then centrifuged at 25, and the coffee material introduced into the extracting vessel 26 which is provided with an agitator 27 and a steam coil 28. The mixture of coffee material from centrifuge 25 and No. 3 extract through line 29 is maintained at a temperature of about 125° F. (120°-130°) for one hour with agitation. The material is then centrifuged at 30, the liquid, No. 2 extract, going through line 24 to cooker 22 as described, and the solids to the extracting vessel 31 provided with agitator 27 and steam coil 28, into which is introduced about 10 to 13 gallons of fresh water and about ½ ounce of taka-diastase in the powdered form. The extraction proceeds at a temperature of about 125° F. for one hour. with agitation; after which the material is centrifuged at 32, the spent grounds being discharged at 33 and the liquid, No. 3 extract, through line 29 to the extracting vessel 26. The extraction at about 125° F. (120°-130°) is for the purpose of giving an optimum temperature for action of the taka-diastase.

Obviously the process might employ a larger number of extracting operations.

The No. 1 extract from centrifuge 25 is preferably clarified in the clarifying centrifuge 34 and is then introduced into the vacuum pan 35, operating, for example, at a vacuum of 28 inches of mercury, in which the extract is evaporated to a density of about 30°-32° Baumé. Preferably, and particularly if the extract is to be evaporated to dryness, there is added to the evaporated extract at 36 (or to the extract going to the vacuum pan 35) about ½ ounce of hydrogenated oil, which may be coffee oil or any hydrogenated vegetable oil, which, in the amount used, does not affect the taste of the extract. The addition of the hydrogenated oil to the material in process is not covered generically herein as it is disclosed or claimed in applicant's co-pending application, Serial No. 375,542, filed January 21, 1941. The use of the oil is claimed herein only as the stage of the process and for the purposes specified.

The low temperature extract from the freezing operations is mixed at 37 with the concentrated extract from the counter-current extracting system. This mixture may be packaged and sold as a liquid or semi-liquid extract, or it may be subjected to a drying operation, preferably of the instantaneous type. The drawings indicate a pair of drying rolls 38, 38, into the bight of which is introduced the liquid from mixer 37. The rolls will, of course, be provided with the usual doctor blades for scraping off the material, which may then be reduced to a powder in the pulverizer 39. A single drying roll may be used, in which case the density of the extract mixture need not be quite as high as indicated. That is, it may be possible to omit some or all of the freezing operations. It will also be possible to use spray drying instead of drying upon roll or rolls.

By employment of the process as described, the final extract will contain extractives, of a more or less volatile character and resulting from the preliminary low temperature extracting operation, to compensate for the removal, destruction or deterioration of corresponding constituents of the coffee material which occur as a consequence of the relatively high temperatures prevailing in the counter-current extracting system and also in the vacuum pan employed for evaporating or concentrating the extract from the counter-current extracting system. In this way, without sacrifice of yields, the extract has the flavor and aroma of the original coffee material.

*Example 2—Modified coffee extraction process.*—Instead of using fresh water in the preliminary low temperature extraction and concentrating the extract by freezing, it will be possible to omit the freezing operations and obtain an extract of sufficiently high density by using, instead of fresh water, for the preliminary soaking operation, an extract from the counter-current extracting system. Or this expedient may be combined with the freezing process.

In any case, a low temperature extract or juice containing extractives preserved, because of the low temperature, is mixed with the more concentrated extract obtained through the use of relatively high temperatures, so as to give the final extract mixture extractives of a character which the extract from the usual coffee extracting system does not have, or in which it is more or less deficient, because of the high temperatures at which the entire material is subjected. The employment of diastase in connection with the extraction requires a temperature favorable to the enzymes, and at this temperature certain extractives are driven off or destroyed, partially or wholly. This effect takes place to a greater extent in the vacuum pan. The resultant deficiency in these extractives is compensated for by the addition of the low temperature extract.

*Example 3—Fruit or vegetable juice (tomato juice), Figure 2.*—100 pounds of tomatoes are pulped at 40 by any suitable pulping apparatus and the juice frozen at 41. The ice is crushed at 42 and centrifuged at 43. The liquid from the centrifuge 43 is frozen at 44, crushed at 45, and centrifuged at 46. The freezing, crushing and centrifuging operations may be repeated as often as necessary or desirable in order to obtain an extract of high density as working conditions may require. This low temperature extract may have a density of 15°-20° Baumé. The pulp from the pulping operation at 40 is introduced through line 47 into the mixer 48, together with the ice from centrifuges 43, 46 through lines 49, 50. About ¼ of an ounce of powdered taka-diastase is preferably introduced into the mixer 48 and the mixture heated to a temperature of about 125° F. (120°-130° F.) for about one hour. The material from mixer 48 is centrifuged at 51 and the spent pulp discharged from the process; or it may be retreated. The juice from centrifuge 51 is concentrated in the vacuum pan 52, preferably operating at a vacuum of 28 inches of mercury, to a density of 15°-30° Baumé. The concentrated extract from the vacuum pan 52 is mixed at 53 with the low temperature extract from centrifuge 46. This mixture may be bottled or canned or, for a dry product, may be dried on the drying rolls 54, 54 and powdered in the pulverizer 55.

If the vegetable or fruit juice treated in accordance with this example is to be dried to a powder, about 1/16 to ¼ of 1%, based upon the weight of the extract, of a hydrogenated vegetable oil, is introduced into the mixer 53 to prevent the volatilization of extractives in the drying operation at 54, 54. It is not necessary that all of the oil used be hydrogenated. Enough, say ¼, should be hydrogenated in order to prevent the development of rancidity.

*Example 4—Soup process.*—The process illustrated in Figure 2 may be adapted to the manufacture of soups by introducing into mixture 48 the ordinary soup ingredients; vessel 48 being, in this case, the soup kettle. The flavor of the soup is improved by the ultimate introduction thereinto of the low temperature extract.

*Example 5—Condensed, evaporated or powdered milk, Figure 3.*—10 gallons of milk are frozen at 57, the ice crushed at 58, and centrifuged at 59. The liquid is frozen at 60 and the ice crushed at 61 and centrifuged at 62. The freezing, crushing and centrifuging operations may be repeated as often as may be required. The ice from centrifuges 59 and 62 is introduced through lines 63, 64, into the vacuum pan 65 into which is also introduced, preferably, 10 gallons of fresh milk. The vacuum pan may operate at a vacuum of 28 inches of mercury and the milk is thickened to a density of about 20°-30° Baumé. The ice extract, in line 66, which may have a density of 12°-20° Baumé, is introduced with the partially evaporated milk from the vacuum pan 65, through line 67 into the heater 68 through which is introduced 1/14 of an ounce of taka-diastase, which serves not only to soften the casein but to preserve the milk. The mixture is heated to a temperature of 125° F. for about one hour with agitation. In the case of condensed milk, sugar may be added as is customary. The mixture from the heater 68 may be bottled or canned, or may be dried on the drying rolls 69, 69 and powdered in pulverizer 70.

As in the other processes a small quantity of hydrogenated oil may be introduced into the mixture before drying on the rolls 69, 69.

No claim is made specifically to the herein described processes for the production of coffee extracts as these processes are covered by copending application of the applicant, filed September 21, 1942, as a continuation-in-part hereof, as Serial No. 459,104.

I claim:

1. Treatment of an edible liquid selected from liquids of animal and vegetable origin to inhibit detrimental bacterial action which comprises: incorporating in and reacting with the liquid a small amount of taka-diastase.

2. Treatment of an edible liquid selected from liquids of animal and vegetable origin to inhibit detrimental bacterial action which comprises: incorporating in the liquid a small amount of taka-diastase and agitating the liquid at a temperature of about 120°-130° F.

3. Treatment of an edible liquid selected from liquids of animal and vegetable origin to inhibit detrimental bacterial action which comprises: incorporating in and reacting with the liquid a small amount of a tasteless diastase.

4. Treatment of selected juices of vegetable and animal origin to prevent deterioration which comprises: incorporating in and reacting with said juices a small amount of taka-diastase and maintaining the material at a temperature favorable to the action of diastase.

5. Improved process of making edible extracts from selected vegetable and animal materials which comprises: making a concentrated extract from the selected material by prolonged cooking at relatively high temperatures; adding to said concentrated extract a concentrated extract of like material made at a freezing temperature; and subjecting the mixture to a substantially instantaneous drying operation to evaporate moisture therefrom.

6. Improved process of making edible extracts from selected vegetable and animal materials which comprises: making a low temperature concentrated extract from the selected material by freezing the same; making a concentrated extract from the residual material by prolonged application of heat; and mixing these extracts.

7. Improved process of making edible extracts from selected vegetable and animal materials which comprises: making a low temperature extract from the selected material by freezing the same and removing the ice crystals from the heavier liquid; making a concentrated extract from the residual material by prolonged application of heat; mixing these extracts; and subjecting the mixture to a substantially instantaneous evaporating operation to reduce the mixture to substantial dryness.

JOHN L. KELLOGG.